United States Patent [19]

Shih

[11] 3,758,656
[45] Sept. 11, 1973

[54] PROCESS FOR PREPARING AN ELASTOMER WHICH IS STRUCTURALLY SUPPORTED AGAINST EXCESSIVE COLD FLOW DURING SHIPMENT OR STORAGE

[75] Inventor: Chi-Kai Shih, Wilmington, Del.

[73] Assignee: E. I. du Pont de Nemours and Company, Wilmington, Del.

[22] Filed: Mar. 25, 1970

[21] Appl. No.: 22,659

Related U.S. Application Data

[63] Continuation-in-part of Ser. No. 732,872, May 29, 1963, abandoned.

[52] U.S. Cl....... 264/115, 117/100 C, 117/138.8 A, 156/62.2, 156/244, 156/250, 161/168, 260/897 A, 264/143, 264/144, 264/171, 264/176 R, 264/176 F, 264/320, 264/331
[51] Int. Cl. ......................... B29f 3/10, C08d 13/24
[58] Field of Search.................. 264/171, 172, 174, 264/169, 122, 331, 320, 319, 143, 144, 176 R, 176 F; 260/897 AR, 897 B, 897 A; 161/253, 168; 117/100 C, 138.8 A; 156/62.2, 244, 250

[56] References Cited
UNITED STATES PATENTS

| 3,669,722 | 6/1972 | Bishop | 260/897 A |
| 3,166,612 | 1/1965 | Sauer et al. | 264/174 X |
| 3,458,615 | 7/1969 | Bragaw et al. | 264/171 |
| 3,488,747 | 1/1970 | Cleereman | 264/122 X |
| 3,361,850 | 1/1968 | Young | 260/897 B |
| 3,244,785 | 4/1966 | Hollandsworth | 264/171 |
| 3,359,344 | 12/1967 | Fukushima | 260/897 B |
| 3,415,920 | 12/1968 | Lee et al. | 264/171 |
| 3,089,196 | 5/1963 | Knapp et al. | 264/140 X |
| 3,532,592 | 10/1970 | Kraus et al. | 161/253 X |

FOREIGN PATENTS OR APPLICATIONS

| 825,884 | 12/1959 | Great Britain | 260/897 |
| 253,710 | 2/1963 | Australia | 161/253 |
| 964,415 | 7/1964 | Great Britain | 161/253 |

Primary Examiner—Philip E. Anderson
Attorney—James J. Flynn

[57] ABSTRACT

A process comprising forming an elastomer into elongated form, covering it with a sheet of ethylene polymer having a cold-flow of less than 30 percent at 60° C., and a melt index of about 0.1–100, dividing the covered elastomer into shorter units, and assembling these units into a compact mass. The elastomeric product is structurally supported against cold-flow.

5 Claims, 2 Drawing Figures

Patented Sept. 11, 1973 3,758,656

PROCESS FOR PREPARING AN ELASTOMER WHICH IS STRUCTURALLY SUPPORTED AGAINST EXCESSIVE COLD FLOW DURING SHIPMENT OR STORAGE

PRIORITY

This application is a continuation-in-part of application Ser. No. 732,872 filed May 29, 1968 and now abandoned.

BACKGROUND OF THE INVENTION

This invention relates to elastomeric compositions having good cold-flow properties and to a process for preparing them.

It is well known that certain sulfur-curable elastomers particularly alpha-olefin/non-conjugated diene (ODM) polymers, while uncured, exhibit unsatisfactoy cold-flow during storage or shipment, thereby making handling, as well as working on a rubber mill at desired oil loadings, difficult or practically impossible. Representative elastomers of this type have Mooney viscosities of about 10–100 (ML-4/100° C.) and, although, the cold-flow problem is most acute with the lower viscosity grades, even the higher viscosity types tend to exhibit this behavior during the warm months of the year. In some instances these polymers settle very substantially, creating difficulty in removal from containers. At other times they burst their packages or flow from ruptures in the bag-containers with resultant contamination or loss of valuable material.

SUMMARY OF THE INVENTION

In accordance with this invention there is provided an elastomeric composition comprising essentially (a) an elastomer structurally supported against excessive cold-flow by an internal network of (b) a normally solid hydrocarbon polymer of ethylene which is compatible with the elastomeric polymer and has a cold-flow less than 30 percent at 60° C. Both of the essential polymers in the composition can contain ethylene units and therefore to avoid confusion the supported polymer (a) is referred to as the "elastomeric polymer" and the supporting polymer (b) is called the "network polymer."

"Comprising essentially" means that the specified components are present and that other components can also be present so long as they do not change materially the cold-flow properties imparted to the composition by the specified components.

The elastomeric compositions of this invention can be produced conveniently by shaping an elastomer into substantially elongated form, covering it at least partially with a sheet of normally solid extrudable hydrocarbon polymer of the type described above, dividing the covered elastomer polymer into shorter units and assembling these randomly or systematically into a compact mass. Alternatively the elastomer polymer can be divided by any convenient means into small portions which are then individually encased or partially encased in network polymer films before being assembled and compacted.

The compositions of this invention exhibit remarkably reduced cold-flow properties compared to those of the elastomeric component alone.

DETAILS OF THE INVENTION

Figure 1:
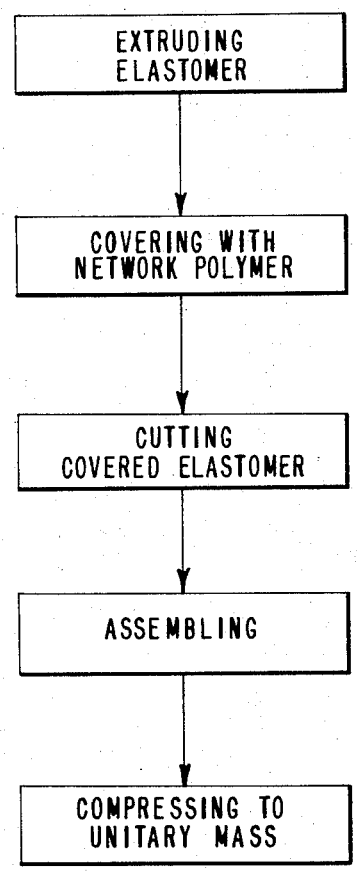
FIG. 1 is a flow sheet illustrating a preferred embodiment of the process.

Depending upon the procedure utilized the supporting polymer component of the composition of this invention can be in the form of a substantially continuous network throughout the elastomeric mass with the elastomer as a discontinuous component. The network polymer need not be in the form of a single integral film unit; normally it is in the form of numerous relatively small discrete films encasing or partially encasing small portions of elastomer and touching adjacent film casings so that the effect and appearance is that of a continuous or partially continuous interlaced network of film strips randomly oriented throughout the elastomeric polymer to provide structural support. The structurally supported composition comprises a matrix of normally solid polyethylene forming a heterogeneous separate-phase network throughout the elastomer.

This invention is useful for improving the cold-flow properties of elastomers generally, but is of particular utility with sulfur-curable alpha-olefin/non-conjugated diene (ODM) polymers in which the diene has only one terminal double bond. Representative alpha-olefins contain about 2–10 carbon atoms and include ethylene, propylene, 1-butene, 1-heptene, 1-decene, etc. Representative non-conjugated dienes include aliphatic open-chain diolefins containing from 6–22 carbons and which have only one terminal double bond such as 1,4-hexadiene; dicyclopentadiene; a 5-alkenyl-substituted nonbornene such as 5(2-butenyl)-2-norbornene; a 2-alkyl-2,5-norbornadiene; 1,5-cyclooctadiene; and a 5-alkylidene-2-norbornene such as 5-methylene-2-norbornene and 5-ethylidene-2-norbornene. Hydrocarbon elastomers of this type are more particularly described in U.S. Pat. Nos. 2,933,480, 3,063,973, 3,093,620, 3,093,621 and 3,260,708 and the disclosures in these patents are specifically incorporated herein by reference. A particularly preferred elastomer to be employed in the present invention is a terpolymer of ethylene, another alpha-olefin, such as propylene, and an open chain aliphatic diene, such as 1,4-hexadiene. Other preferred elastomers are ethylene/alpha-olefin polymers, especially ethylene/propylene polymers.

The network polymer has a cold-flow of less than about 30 percent to 60° C. and is present in the composition in an amount of about 0.5–10 phr. (parts network polymer per 100 parts by weight of elastomeric polymer). The ethylene polymer used for this purpose can be polyethylene or a hydrocarbon copolymer of ethylene and another olefin. It is preferred that the melting point for the network polymer range from about 100°–135° C. and that it have a melt index ranging from about 0.1 to 100 measured by ASTM-D-1238-65T condition E. Representative polymers include copolymers such as ethylene/alpha-olefin copolymers in which the alpha-olefin contains 3–8 carbons such a propylene, butene, pentene, heptene and the like. Preferably the network polymer is a saturated hydrocarbon polymer and polyethylene is particularly preferred because of its strength, low cold-flow and availability. The network polymers of the type described are well known in the art and they can be made by any conventional procedure.

In general, it is only necessary to add up to about 5 parts of network polymer per hundred parts of elastomer by weight. Those skilled in the art can readily determine the optimum amount to use for a particular elastomer and a specified set of environmental conditions. In general, the higher the Mooney viscosity of the elastomer, the smaller the proportion of network polymer needed to achieve the results desired. As the polymer viscosity decreases and the storage temperature increases, it is necessary to use somewhat greater proportions of the network polymer.

In one embodiment a network polymer is extruded in the form of continuous or discontinuous strands, ribbons or films and the elastomeric polymer is interlaced therewith in any convenient manner to provide physical support. Thus the elastomeric polymer can be sandwiched between film portions of the network polymer or interwoven or interlaced with strands or ribbons thereof by any convenient means. It is only necessary that the network polymer in some form (e.g., strand, ribbon, film, etc.) be dispersed fairly uniformly throughout the elastomeric polymer mass to provide the desired support.

Figure 2:
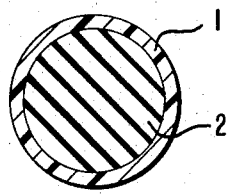
FIG. 2 is a cross-sectional view of elastomer coated with polyethylene.

Reference is now made to the drawing wherein FIG. 1 depicts a flow diagram illustrating a convenient method for preparing compositions of this invention. The process involves extruding the elastomeric polymer into an elongated shape and simultaneously extruding the network polymer as a film partially or completely encasing the elastomeric extrudate. The resulting composite structure is illustrated in FIG. 2 of the drawing showing a cross-sectional view of elastomer 2 coated with polyethylene 1. The resulting elongated elastomeric polymer in the network polymer sheath can then be cut into segments (conveniently having a length-to-diameter ratio of about 1:1-2:1) and the segments randomly assembled for storage, shipment or use by pressing or otherwise compacting sufficiently to produce a unitary mass which can be conveniently handled. This compaction results in the formation of a network of solid polymer sheet material dispersed throughout the elastomeric mass so that the resulting composition is interlaced with network polymer film strips or sheets, providing the composition with flow properties substantially superior to those of the elastomer alone.

The above described convenient method for preparing compositions of this invention is illustrated in the drawing. FIG. 1 depicts an extruder wherein elastomeric polymer is extruded through orifice (1) and wherein polyethylene is simultaneously extruded from concentric orifice (2) thereby encasing the elastomeric extrudate. The polyethylene coated extrudate is depicted in FIG. 2 showing a cross-sectional view of a coated extrudate wherein the polymer sheet material (3) encases the elastomeric extrudate (4).

Alternatively the elastomeric polymer can be formed into small units of convenient size wrapped in network polymer films and then assembled and compacted into a larger mass as before. The art is well aware of the numerous ways in which elastomeric masses can be subdivided into small units and any of these is suitable. Similarly the art is aware of the numerous ways in which such small portions of matter can be partially or wholly encased or sheathed in films and any of these methods is also suitable for practicing this invention so long as the two polymers have the characteristics herein set forth. For example, small portions of elastomeric polymers of suitable size and shape can be sprayed with the network polymer or solutions thereof to form the casing or envelope, or the portions of elastomeric polymer can be rolled through a liquid layer containing network polymer (molten polymer or a solution thereof) so that the latter adheres to at least part of the elastomer surface. In these alternative procedures the elastomer polymer of a suitable size and shape, both of which are not critical in this invention, is at least partially surface coated with network polymer, and the coated material is assembled with random or systematic orientation into a larger mass and compacted to provide a unitary whole which exhibits improved cold-flow properties compared to the elastomeric polymer alone.

The size of the portions of coated elastomer prior to assembly and compaction is not critical but should be controlled to provide the desired improvement in cold-flow properties. Thus an elastomer with poor cold-flow properties needs more support than one with relatively better cold-flow properties. Such support can be effected in a variety of ways such as, for example, sheathing or encasing relatively small portions of the elastomer in network polymer and/or using a network polymer having exceptionally good cold-flow properties. Small portions of elastomeric polymer encased in network polymer provide greater improvements in cold-flow properties than do larger portions.

The network polymer is normally used as a film having a thickness of about 0.5-3 mils and preferably 1-2 mils. It will usually be utilized to encase generally cylindrical portions (pellets or chips) of elastomeric polymer having a diameter of about ⅛-½ inch and a length of about 0.1-3 inches. Following encasement of the polymer and subdivision thereof, where necessary, the encased or partially encased chips can be assembled into a random pile and compacted by pressing into bales weighing about 34 kilograms for convenient shipping.

Desirably the network polymer is compatible with the elastomeric polymer, that is, it has properties such that milling or Banbury mixing of the structurally supported composition results in a disintegration of the network polymer matrix and produces a uniform elastomeric composition having properties not significantly different from those of the elastomer above. The proportions of network polymer should be as small as will provide the desired reduction in cold-flow and also provide compatibility.

The cold-flow of an elastomeric composition is measured by a compression set device which operates on a cylindrical pellet of the composition, about ¾ inch in diameter and about ½ inch in height. The precise height, $t_o$, of the pellet is measured. After the pellet has been heated in an oven at 60° C. for 20 minutes, it is transferred to the test apparatus (preheated to 60° C.). During the 1-hour test the pellet is compressed on a flat metal surface by a 0.772 pound brass weight. The lower end of the weight has a diameter of 3 inches and a height of 5/16 inch. The pellet is placed below the center of the weight. The upper end of the brass weight is a stem having a length of 2.50 inch and a diameter of 0.5 inch. This stem is positioned for free vertical movement within a hole in a plate parallel to the surface on which the pellet rests. During the test, the brass weight gradually settles as the polymer pellet flows. Initially the pressure on the polymer pellet is 1.75 lb./sq. in. but as the pellet flows, the surface area increases, causing the pressure to decrease. At the end of one hour, the sample is removed and its new height ($t$) is measured. The percent cold-flow (cold compression set) equals $$t_o - t/t_o \times 100$$

a high value indicating a high cold-flow and a low value indicating low cold-flow.

The following examples illustrate the invention. All parts, percentages and proportions are by weight unless otherwise indicated. Cold-flow of each of the polyethylene samples is less than 30 percent at 60° C.

EXAMPLE 1

A branched polyethylene (1) has a density of 0.92 gram per cubic centimeter, a melting point of 112° C. and a melt index of 1.9.

A branched polyethylene (2) has a density of 0.916 gram per cubic centimeter, a melting point of 110° C. and a melt index of 25.

Density is measured by ASTM test method D-1505-60T, the sample being conditioned for this measurement by slow cooling from the melt according to ASTM procedure D-1928-62T, procedure A. Melt index is measured according to ASTM procedure D-1238-65.

A 61/36/3 ethylene/propylene/1,4-hexadiene terpolymer elastomer is prepared by copolymerizing the monomers. in tetrachloroethylene in the presence of a coordination catalyst comprising vanadium tetrachloride and diisobutyl aluminum chloride. This hydrocarbon elastomer product has a Mooney viscosity (ML-4/250° F.) of 58. The unsaturation available for sulfur curing amounts to about 0.284 gram-moles ethylenic double bonds per kilogram.

A sample of the terpolymer is oil extended with 75 phr. (parts per hundred parts polymer) of a paraffinic petroleum oil having a specific gravity of 60° F. of 0.8762, a density of 0.8725, a flash point of 495° F., a molecular weight of 530 and a viscosity-gravity constant of 0.803 and an aniline point of 242° F.

The oil extended terpolymer is heated to 150°–180° C. and extruded through a ⅛-inch diameter circular die at the rate of 30–50 grams per minute using a 1 (2-inch) Spirod Roy Royle extruder. One sample of extrudate is wrapped with a single layer of 1.4 mil film made from branched polyethylene 1 above. A second sample is wrapped with a single layer of 1.5 mil film made from branched polyethylene 2 above. A third sample is wrapped with two layers of the latter film.

Each of the resulting covered extrudates is then cut into 0.25-inch lengths. These are assembled with random orientations into three respective masses and compressed to unitary wholes, each containing a matrix of normally solid polyethylene film having the apparent structure of a substantially continuous separate phase network interlacing the whole composition. Pellets suitable for cold compression set measurements (0.75 inch in diameter, 0.5 inch in height) are molded and tested with the results shown below.

TABLE I

| Sample | Polyethylene Content (PHR) | Cold-Flow (%) |
|---|---|---|
| 1 | 5.0 | 25 |
| 2 | 5.6 | 47.5 |
| 3 | 10.4 | 22 |

In comparison the same oil-extended terpolymer containing no polyethylene matrix has a cold-flow of 70 percent.

EXAMPLE 2

Three samples of linear polyethylene have the following respective properties:

TABLE II

| Polyethylene | Melt Index | Density (gms/cm) | Melting Point (°C.) |
|---|---|---|---|
| 3 | 0.3 | 0.96 | 135 |
| 4 | 2.8 | 0.967 | 135 |
| 5 | 17.5 | 0.971 | 135 |

Each of these samples is made into films having three different thicknesses (e.g., 0.5, 1.0 and 1.5 mils) which were wrapped around a portion of ⅛ inch diameter strand made by extruding the elastomer of Example 1. There was thus provided a set of coated samples for each of the linear polyethylenes having coating thicknesses of 0.5, 1.0 and 1.5 mils, respectively. Each coated sample was chopped into short sections having lengths of about ⅛–¼ inch. Each group of short coated sections was then assembled randomly into a pile and compressed in a Yerzley pellet mold. The pellet displayed the following cold-flow properties:

TABLE III

| Polyethylene Type | Film Thickness Applied to Extrudate | | |
|---|---|---|---|
| | 0.5-mils | 1.0 mils | 1.5 mils |
| 3 | 22 | 16 | 2.7 |
| 4 | 16 | 9.3 | 12 |
| 5 | 8.6 | 8.2 | 12 |

I claim:

1. A process for providing an elastomer structurally supported against excessive cold-flow during shipment or storage which comprises forming an elastomeric polymer into substantially elongated form, covering it at least partially with a sheet of normally solid extrudable hydrocarbon polymer of ethylene compatible with the elastomeric polymer and having a cold-flow of less than 30 percent at 60° C., a melt index of about 0.1–100 and having a thickness of about 0.5–3 mils, dividing the covered elastomeric polymer into shorter units, assembling these units randomly or systematically and compressing them into a compact unitary mass thereby resulting in an elastomeric polymer that is structurally supported by an internal network of strips of solid ethylene hydrocarbon polymer randomly oriented throughout the elastomeric polymer.

2. The process of claim 1 in which the elastomeric polymer is an ethylene/alpha-olefin polymer.

3. The process of claim 2 in which the elastomeric polymer is an ethylene/propylene polymer.

4. The process of claim 3 in which the elastomeric polymer is an ethylene/propylene/non-conjugated diene polymer.

5. The process of claim 4 in which the elastomeric polymer is an ethylene/propylene/1,4-hexadiene polymer.

* * * * *